A. FERRARIS.
PROTRACTOR.
APPLICATION FILED SEPT. 9, 1913.

1,087,751.

Patented Feb. 17, 1914.

Inventor
Anthony Ferraris
By Victor J. Evans
Attorney

Witnesses
Eac G. Flanagan
D. W. Gould

COLUMBIA PLANOGRAPH CO., WASHINGTON, D. C.

UNITED STATES PATENT OFFICE.

ANTHONY FERRARIS, OF BRIDGEPORT, CONNECTICUT.

PROTRACTOR.

1,087,751. Specification of Letters Patent. Patented Feb. 17, 1914.

Application filed September 9, 1913. Serial No. 788,873.

*To all whom it may concern:*

Be it known that I, ANTHONY FERRARIS, a citizen of the United States, residing at Bridgeport, in the county of Fairfield and State of Connecticut, have invented new and useful Improvements in Protractors, of which the following is a specification.

The invention relates to a protractor designed primarily for use in laying off work.

The main object of the present invention is the provision of a protractor having a movable member serving as a scribing guide, which member is adapted for rotative movement about a center and which center has fixed relation with the center of the object on which the laying out is contemplated, the member being adapted to be fixed in any desired position with relation to the protractor scale.

The invention in its preferred form of details will be described in the following specification, reference being had particularly to the accompanying drawings, in which:—

Figure 1:
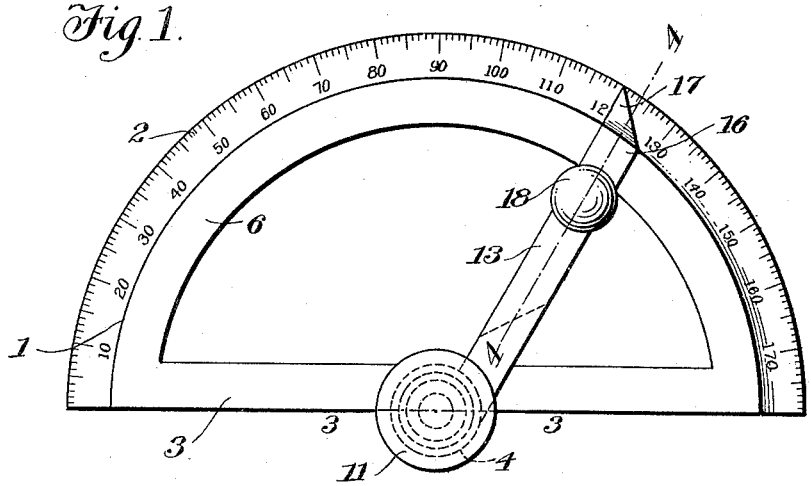
Figure 2:
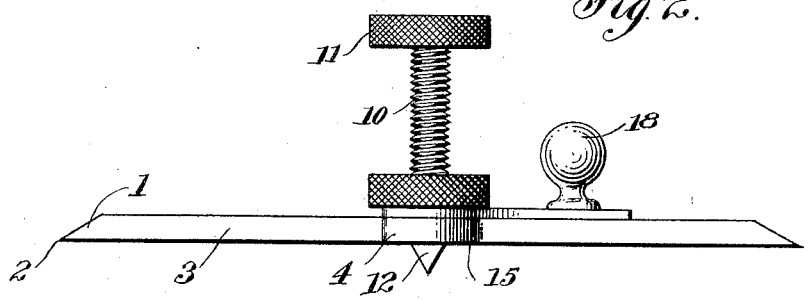
Figure 3:
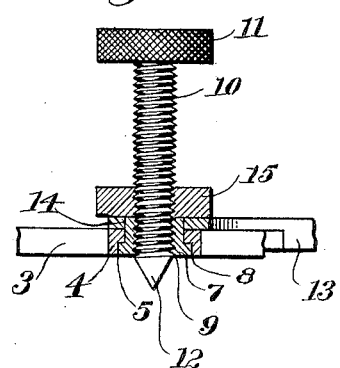
Figure 4:
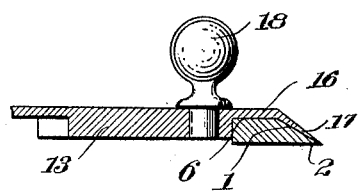

Figure 1 is a plan of the protractor. Fig. 2 is an edge view. Figs. 3 and 4 are sections on lines 3—3 and 4—4 respectively of Fig. 1.

Referring particularly to the accompanying drawings, the improved protractor is shown to include a scale plate 1, the same of usual protractor form having a semi-circular scale edge 2 preferably inscribed to indicate from 1° to 180° and a cross or diametric bar 3, the latter being centrally formed with an offset 4 having an opening 5, the center of which opening is the center of the semi-circular edge. Inwardly of the scale margin is presented a plane portion 6 to form a guide.

Rotatably mounted in the opening 5 is a bushing 7 the latter having a shoulder fitting against the bottom of the opening wall, the latter being preferably partly enlarged as at 8 to receive the shouldered portion of the bushing. The bushing is interiorly threaded at 9 to receive a centering screw 10, said screw having a milled head 11 at one end and 60° point 12 at the opposite end. A gaging arm 13 is arranged to coöperate with the bushing being formed at one end with an opening 14 to fit snugly over the upper projecting end of the bushing, the opening 14 being formed in the relatively reduced portion of the arm and in such relation to the arm that one edge thereof will directly aline or radiate from the center of the protractor. A clamping nut 15 is designed to coöperate with the screw 10 so that it may be moved down to clamp the arm against further movement with respect to the scale member. The free end of the arm is provided with an offset section 16 to bear upon the plane portion 6 of the scale edge, with the pointed end 17 to coöperate with the scale marks. A finger piece 18 is secured in the arm adjacent the free end to provide for moving the arm. In laying off a particular piece of work, the center of such work is found and the point of the screw seated therein. The arm is then adjusted with relation to the scale, in accordance with the particular lines of division required, clamped in place so as to fix it with relation to the scale, and used as a scribing edge for laying off the work.

What is claimed is:—

1. A dividing protractor including a scale member having a degree scale, a bushing rotatably mounted in said member, a centering screw having threaded connection with the bushing, an arm rotatably mounted on the bushing and having a pointed end to coöperate with the scale and a clamp nut coöperating with the screw to secure the arm in fixed relation to the scale member.

2. A protractor including a scale member having a circular scale edge, a bushing rotatably mounted in said member at the center about which the scale edge is formed, a centering screw having threaded connection with the bushing and terminating in a centering point, an arm rotatably mounted on the bushing and having a pointed end to coöperate with the scale and a clamp nut coöperating with the screw to fix the arm with relation to the scale.

3. A protractor including a scale member having a circular scale edge, a bushing rotatably mounted in said member at the center about which the scale edge is formed a centering screw having threaded connection with the bushing and terminating in a centering point, an arm rotatably mounted on the bushing and having a pointed end to coöperate with the scale, and a clamp nut coöperating with the screw to fix the arm with relation to the scale, said arm having one edge in radial alinement with the center about which the scale edge is formed.

In testimony whereof I affix my signature in presence of two witnesses.

ANTHONY FERRARIS.

Witnesses:
SAM BATEMAN,
WM. T. MULLINS.

Copies of this patent may be obtained for five cents each, by addressing the "Commissioner of Patents, Washington, D. C."